(12) United States Patent
Flamm et al.

(10) Patent No.: US 10,006,930 B2
(45) Date of Patent: Jun. 26, 2018

(54) PERFORMANCE OPTIMIZATION OF A DIFFERENTIAL CAPACITANCE BASED MOTION SENSOR

(71) Applicants: Juergen Karl Peter Flamm, Woodland Hills, CA (US); John T. Douglass, Woodland Hills, CA (US); Richard P. Card, Jr., Woodland Hills, CA (US)

(72) Inventors: Juergen Karl Peter Flamm, Woodland Hills, CA (US); John T. Douglass, Woodland Hills, CA (US); Richard P. Card, Jr., Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 985 days.

(21) Appl. No.: 14/295,063

(22) Filed: Jun. 3, 2014

(65) Prior Publication Data
US 2015/0346236 A1 Dec. 3, 2015

(51) Int. Cl.
*G01P 15/125* (2006.01)
*G01P 15/13* (2006.01)

(52) U.S. Cl.
CPC .......... *G01P 15/125* (2013.01); *G01P 15/131* (2013.01)

(58) Field of Classification Search
CPC ...... G01P 15/125; G01P 15/131; G01D 15/24
USPC ....................................................... 324/661
See application file for complete search history.

(56) References Cited

U.S. PATENT DOCUMENTS

| | | | |
|---|---|---|---|
| 5,812,427 A * | 9/1998 | Nonoyama | G01P 15/124 324/166 |
| 6,691,572 B1 | 2/2004 | Handrich | |
| 7,614,300 B2 | 11/2009 | Stewart et al. | |
| 2007/0146019 A1 * | 6/2007 | Foote | G01D 5/24 327/100 |
| 2007/0216423 A1 * | 9/2007 | Grosjean | G01P 15/125 324/661 |
| 2012/0265481 A1 | 10/2012 | Stewart et al. | |

FOREIGN PATENT DOCUMENTS

WO   WO 2010/046367 A1   4/2010

OTHER PUBLICATIONS

Extended European Search Report for corresponding EP15169148.2-1558 dated Sep. 16, 2015; Completed on Sep. 9, 2015.

* cited by examiner

*Primary Examiner* — Mohamed Charioui
*Assistant Examiner* — Catherine Rastovski
(74) *Attorney, Agent, or Firm* — Tarolli, Sundheim, Covell & Tummino LLP

(57) ABSTRACT

A system includes a capacitance sensor having an inertial proof mass disposed between a first electrode structure and a second electrode structure. A switching system is switchable between providing one of a positive charge pulse and a negative charge pulse to one of the first electrode structure and the second electrode structure. A controller controls the switching of the switching circuit to provide one of the positive charge pulse or the negative charge pulse to the first electrode structure during a first portion of a charge cycle time period and to provide an opposite polarity charge pulse from that provided to the first electrode structure to the second electrode structure during a second portion of the charge cycle time period to generate an error signal with respect to the inertial proof mass of the capacitance sensor.

16 Claims, 10 Drawing Sheets

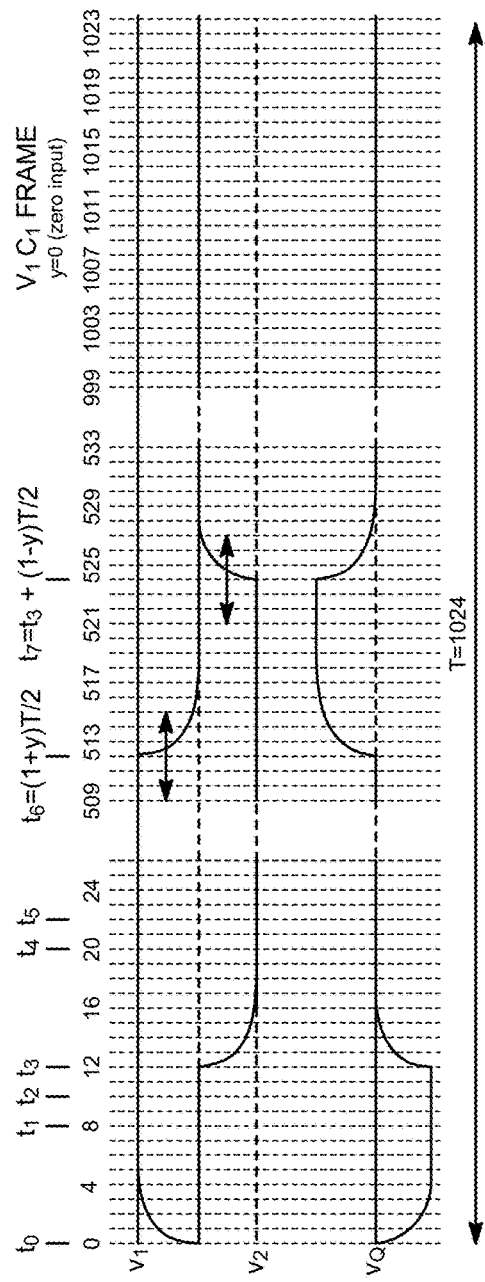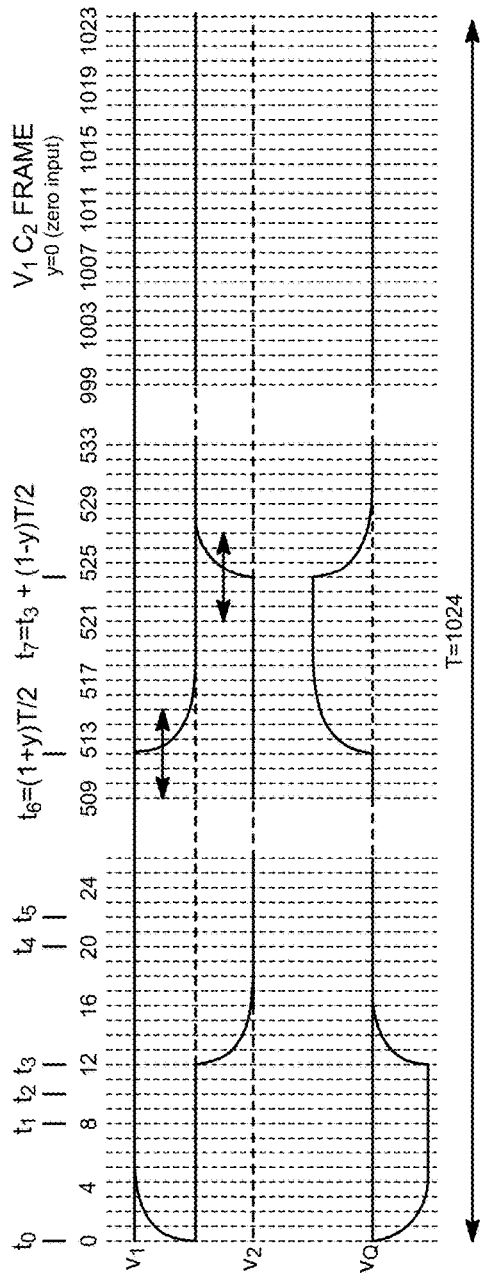

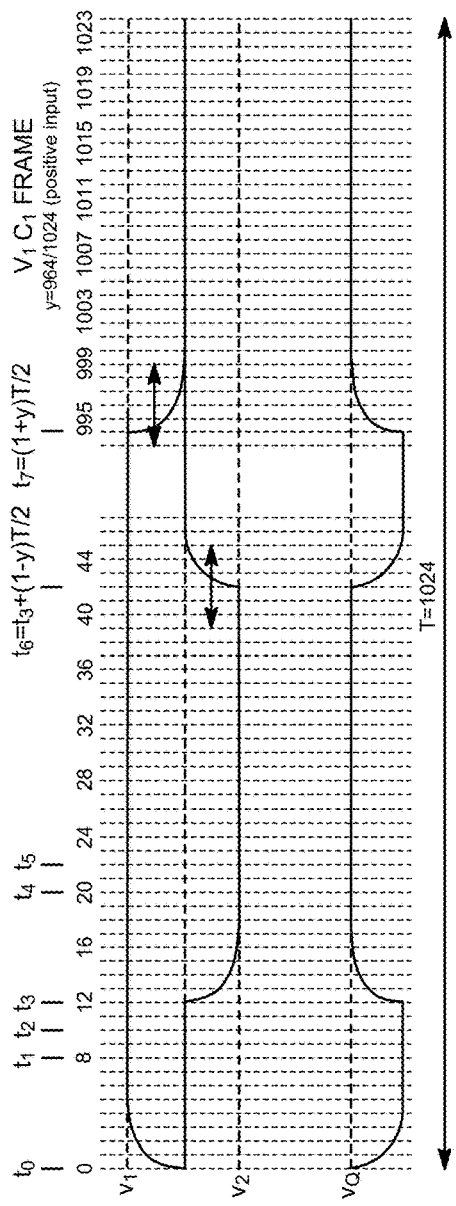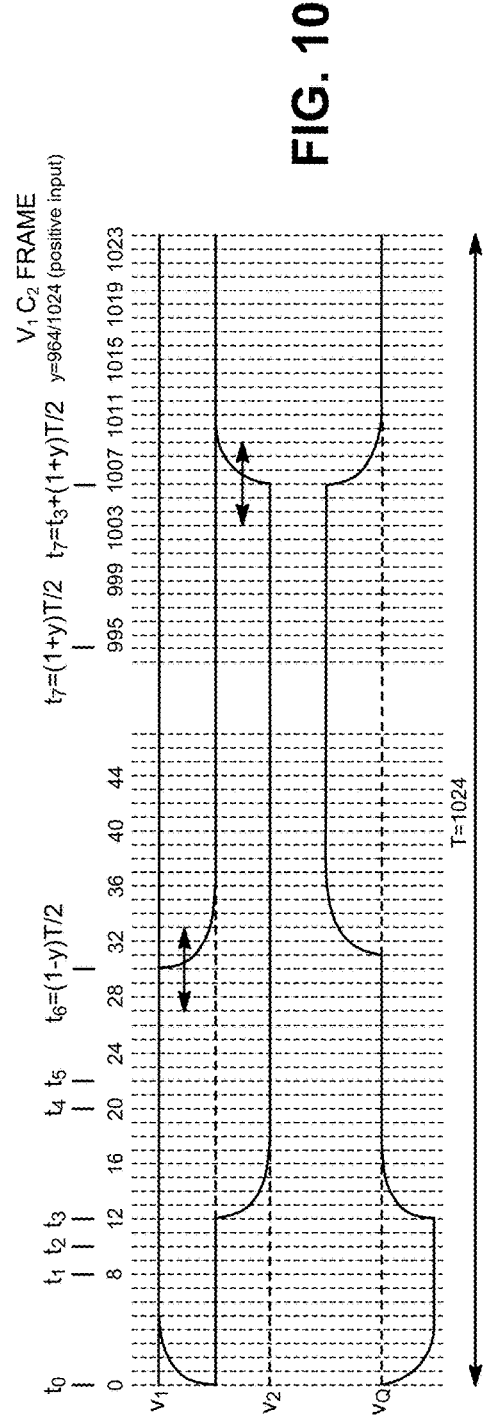

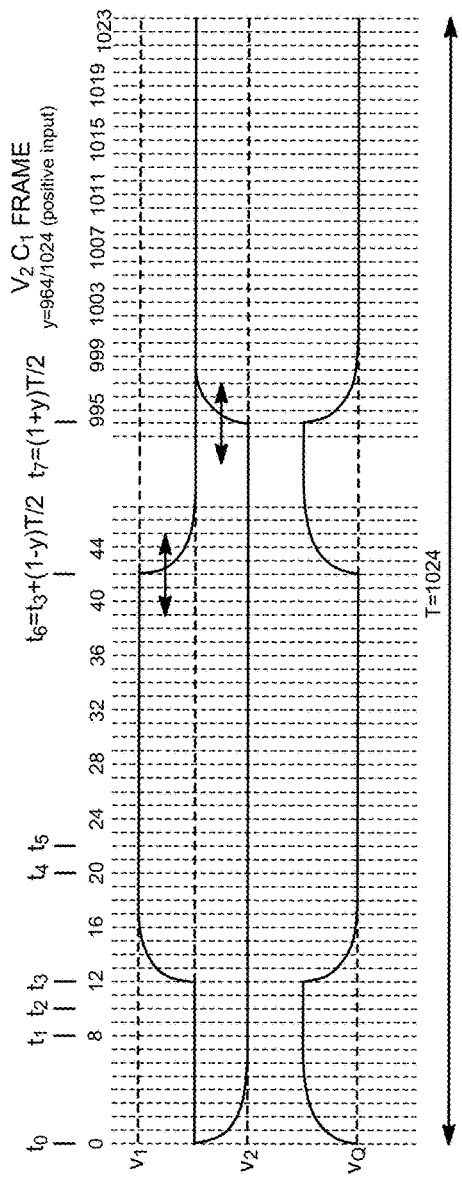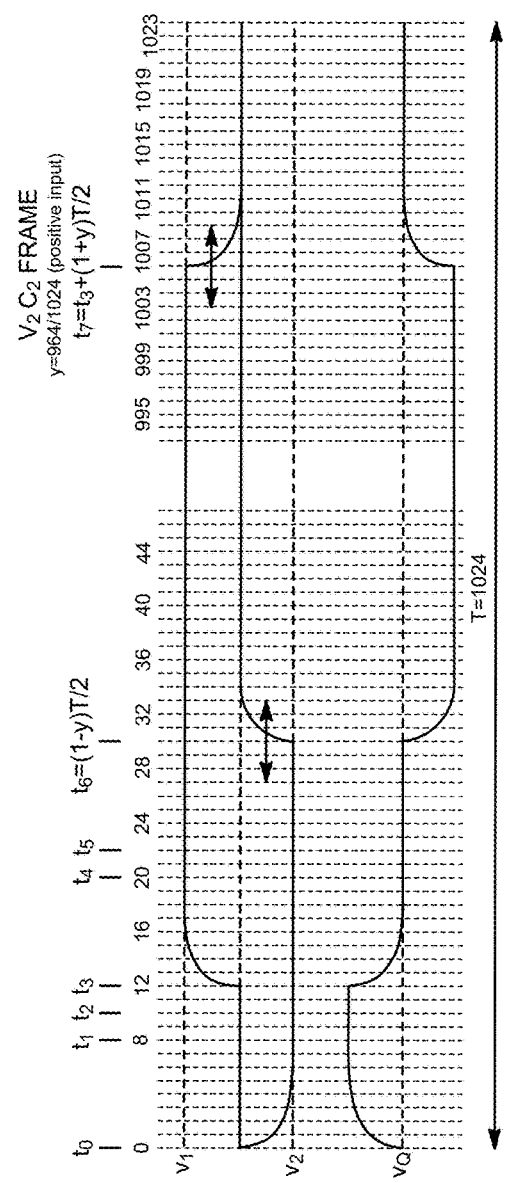

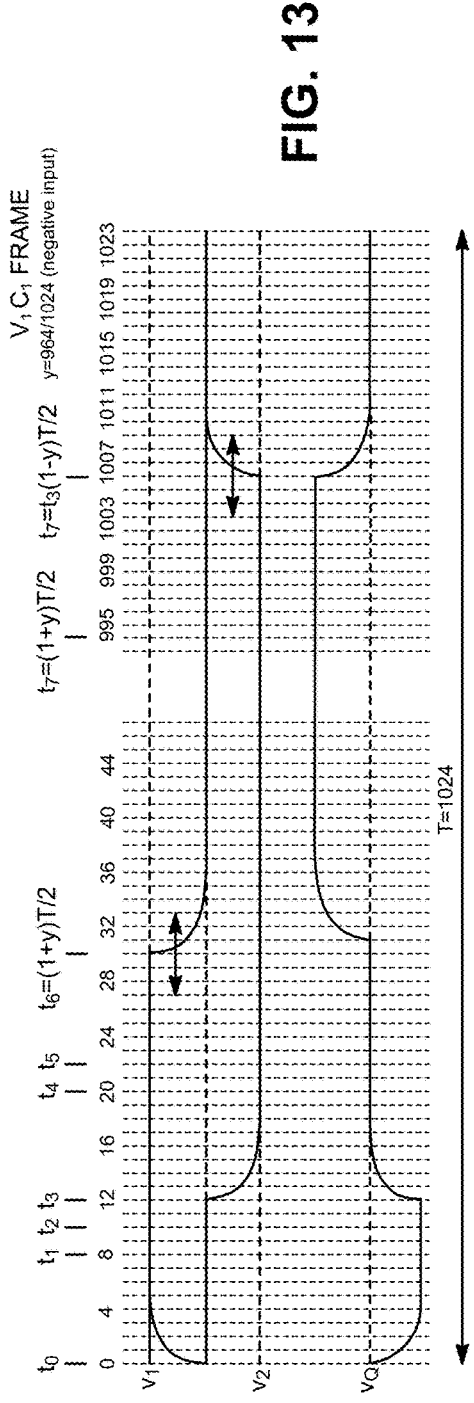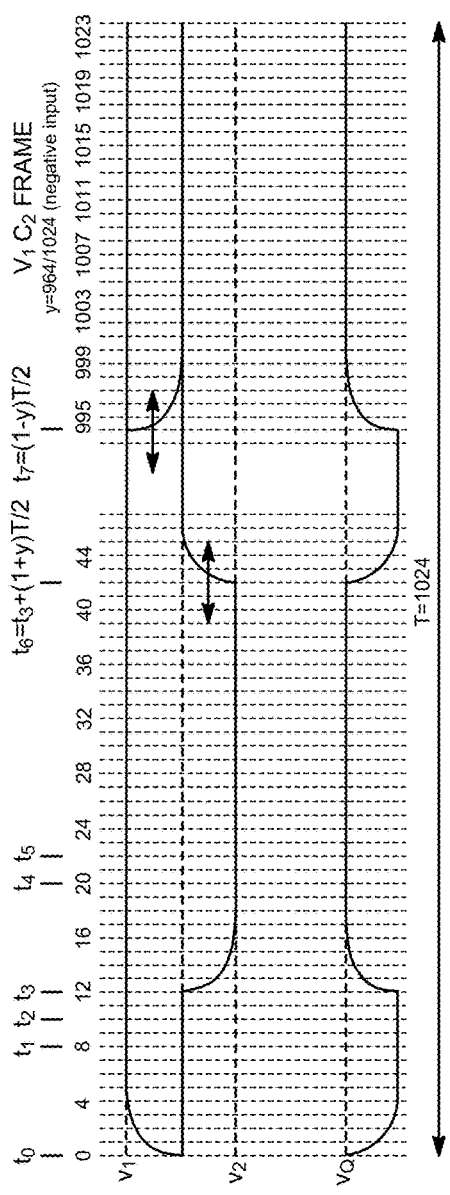

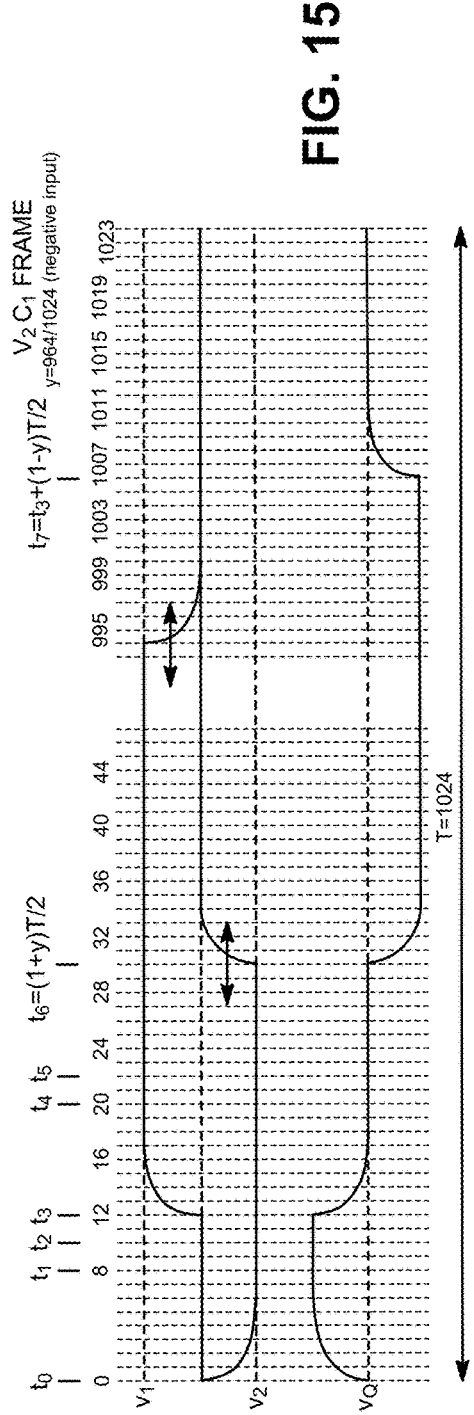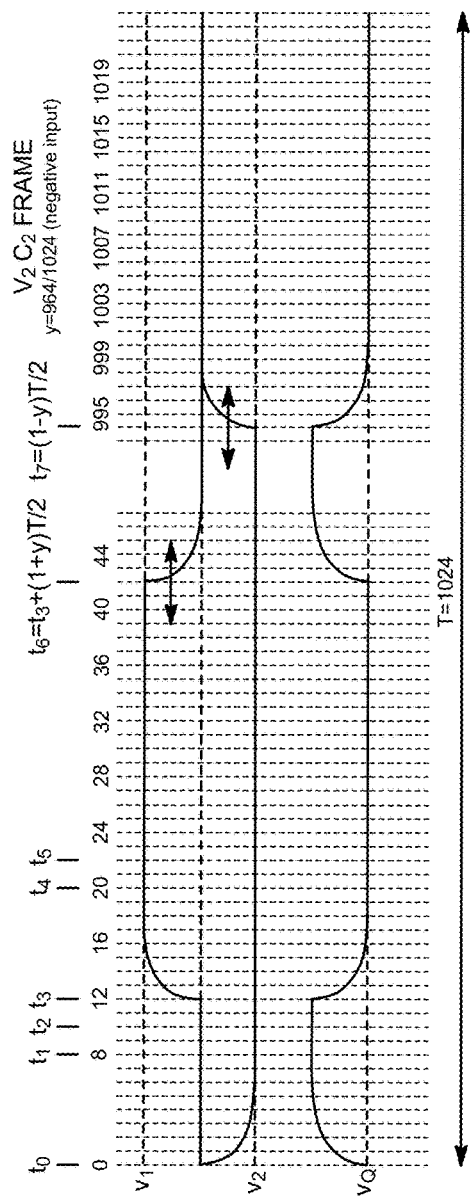

us 10,006,930 B2

PERFORMANCE OPTIMIZATION OF A DIFFERENTIAL CAPACITANCE BASED MOTION SENSOR

TECHNICAL FIELD

This disclosure relates to motion sensors, and more particularly to a system and method that utilizes control voltage and charging sequences to optimize performance of various parameters of a differential capacitance based motion sensor.

BACKGROUND

In a force balanced motion sensor instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself, it is preferred that the feedback force applied by the feedback control network have a linear relation to the sensed input. Thus, special techniques have been employed for obtaining such linearity.

For example, in an electrostatic force balanced accelerometer, electrostatic forcing in a closed loop system is employed to position and obtain an output from a pendulous inertial mass or proof mass. The electrostatic forcing system employs a capacitive pickoff electrode on each side of a pendulous member that has been etched from a silicon substrate. A control pulse is employed to sequentially apply a constant amount of charge to each electrode. A variable force is applied to the inertial mass by varying the amount of time (e.g., duty cycle) the charge is left on a respective structure. The amount of time the charge is left on a respective structure is based on the displacement of the inertial mass relative to a null position. This type of forcing system generally requires the use of sample and hold circuits followed by comparator error amplifiers to measure the charge left on the respective structures. Also, the control pulse should be left on the structure for a substantial period of time to enable proper sampling which can in turn wear down the effectiveness of the accelerometer over time.

SUMMARY

This disclosure relates to a system and method that utilizes control voltage and charging sequences to optimize performance of various parameters of a differential capacitance motion sensor. In one aspect, a system includes a capacitance sensor having an inertial proof mass disposed between a first electrode structure and a second electrode structure. A switching system is switchable between providing one of a positive charge pulse and a negative charge pulse to one of the first electrode structure and the second electrode structure. A controller controls the switching of the switching circuit to provide one of the positive charge pulse or the negative charge pulse to the first electrode structure during a first portion of a charge cycle time period and to provide an opposite polarity charge pulse from that provided to the first electrode structure to the second electrode structure during a second portion of the charge cycle time period to generate an error signal with respect to the inertial proof mass of the capacitance sensor.

In another aspect, a method includes applying pulses to a capacitance sensor in a first polarity configuration during a first portion of a charge cycle time period. The method includes measuring a first measured charge from the capacitance sensor during the first portion of the charge cycle time period. The method includes applying charge pulses to the capacitance sensor in an opposite polarity configuration to the first polarity configuration during a second portion of the charge cycle time period. This includes measuring a second measured charge from the capacitance sensor during a second portion of the charge cycle time period. The method includes measuring a charge difference between the first measured charge and the second measured charge and determining a duty cycle to reduce the charge difference to about zero.

In yet another aspect, an accelerometer includes a capacitance sensor having an inertial proof mass disposed between a first electrode structure and a second electrode structure. A switching circuit is switchable between providing charge pulses to the capacitance sensor in a first polarity configuration to the first electrode structure and providing the charge pulses to the capacitance sensor in an opposite polarity configuration from the first polarity configuration to the second electrode structure. A sequencer generates a frame profile that describes an order of the first polarity configuration and the opposite polarity configuration of charge pulses to be provided to the first electrode structure and the second electrode structure of the capacitance sensor during a charge cycle time period. A controller controls the switching of the switching circuit based on the frame profile received from the sequencer to generate an accelerometer error signal with respect to the inertial proof mass of the capacitance sensor.

BRIEF DESCRIPTION OF THE DRAWINGS

FIGS. 5 though 8 illustrate example timing diagrams that illustrate example charging frame profiles when input acceleration for a differential capacitance sensor is zero.

FIGS. 9 though 12 illustrate example timing diagrams that illustrate example charging frame profiles when input acceleration for a differential capacitance sensor is near full scale positive.

FIGS. 13 though 16 illustrate example timing diagrams that illustrate example charging frame profiles when input acceleration for a differential capacitance sensor is near full scale negative.

DETAILED DESCRIPTION

This disclosure relates to a system and method that utilizes control voltage and charging sequences to optimize performance of various parameters of a differential capacitance motion sensor. The system includes a controller that utilizes a differential capacitance sensor to determine acceleration of a moving body. A linearization approach is provided for the sensor's nonlinear electrostatic forcing function with respect to the derived position error signal of the sensor. A digitally controlled forcing function is provided where two voltage sources of equal magnitude, but opposite polarity are utilized in the same charge cycle time period to generate an error signal to charge the capacitances in a manner that mitigates nonlinearities of the sensor and also mitigates parametric errors of related sensor electronics. By applying opposite charging pulses in the same charge cycle time period as opposed to conventional systems which apply the same polarity charging pulses in a charge cycle time period, one sensor capacitance does not have to be discharged before applying charge to the opposite capacitance to generate an error signal. This enables measuring sensor error signals without conventional sample and hold circuits since an error signal can be measured directly from the sensor without holding a previous charge before determining a sensor charge measurement.

A combination of opposite polarity voltage and charge pulses can be applied to the sensor where electronic components used to perform sensor switching are rendered less sensitive to effects which cause charge leakage and with it errors in the sensor forcing function. Example methods utilize signal sampling via connection and disconnection of the sensor at suitable times, which enables a primary control loop to monitor a motion signal as well as enabling secondary control loops for absolute scale factor and scale factor asymmetry corrections. The methods also mitigate full scale forces from acting on the sensor's moving element by allowing symmetrical pulses of opposite polarity to be applied over multiple sequences (e.g., plus and minus in one sequence and minus and plus in another sequence) wherein various permutations of the two opposite polarity voltages and the two sensor capacitances are exercised.

Figure 1:
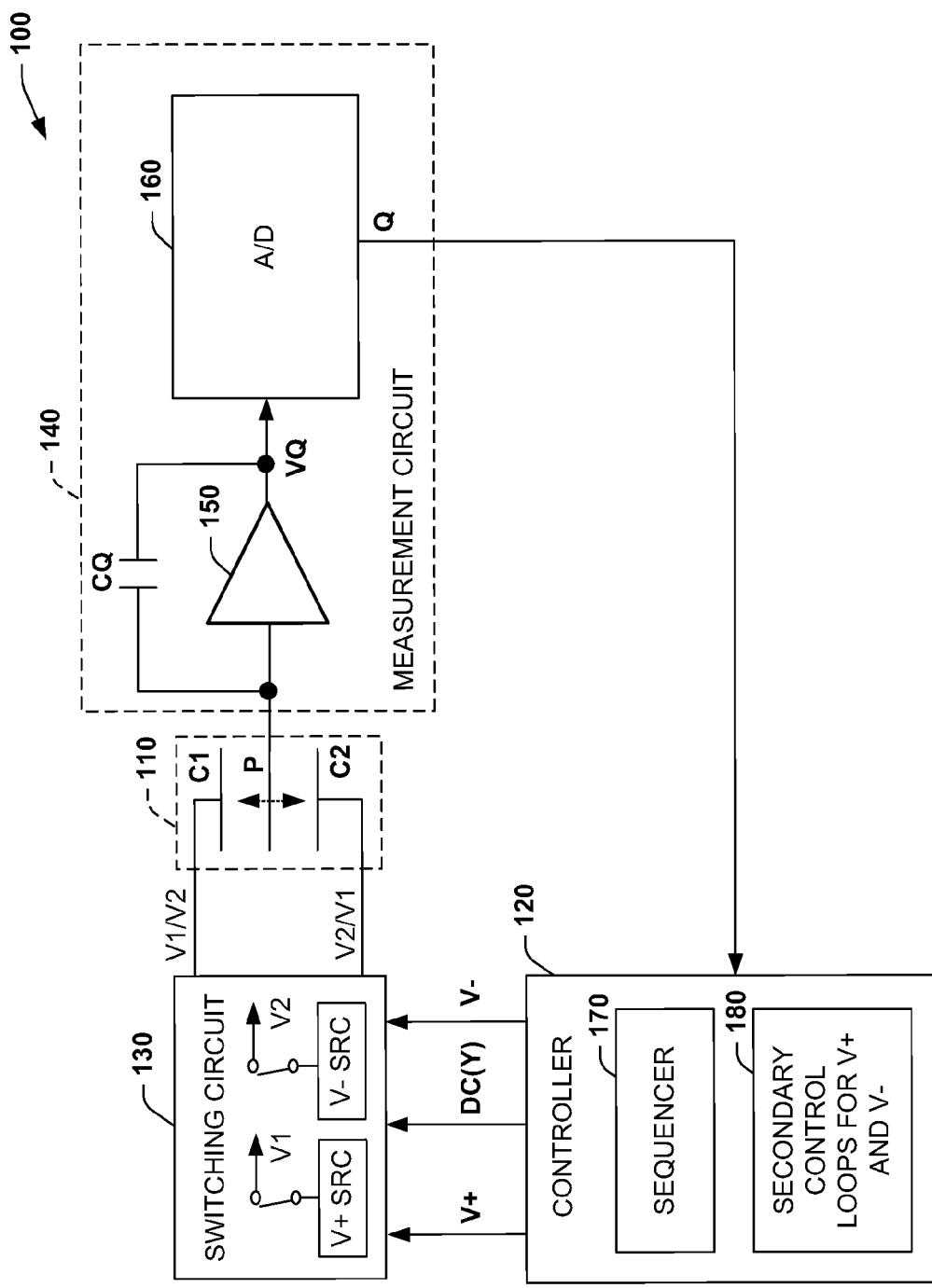
FIG. 1 illustrates an example of a system that utilizes control voltage and charging sequences to optimize performance of various parameters of a differential capacitance motion sensor.

FIG. 1 illustrates an example of a system 100 that utilizes control voltage and charging sequences to optimize performance of various parameters of a differential capacitance motion sensor. The system 100 includes a differential capacitance sensor (DCS) 110 having a first capacitor ($C_1$) formed with respect to a pendulum (P) (also referred to as an inertial proof mass) and a second capacitor ($C_2$) formed with respect to the pendulum. A controller 120 can be employed to control the movement of the pendulum P by commanding a positive and negative voltage to be applied to the first and second capacitor $C_1$ and $C_2$, respectively. As shown, the controller 120 issues commands to a switching circuit 130 that applies the positive and negative voltages to the DCS 110, where the positive and negative voltages are applied during each charge cycle time period to determine an acceleration from the DCS 110.

As used herein, a charge cycle time period refers to one period of time where charging voltages are applied to the sensor and an error signal from the sensor is determined. A charge cycle sequence refers to the charge pulses that are applied to the sensor during the charge cycle time period. The charge cycle sequence always describes at least two charge pulses to be applied in the sequence where one pulse is one polarity and the other pulse is the opposite polarity. The charge cycle sequence can be described in a frame profile which is described in more detail below with respect to FIG. 2. One frame profile, which describes one charge cycle sequence, is executed each charge cycle time period. Execution of multiple frame profiles over multiple charge cycle time periods is referred to as a frame sequence.

A measurement circuit 140 determines a charge (Q) applied to the first capacitor $C_1$ and the second capacitor $C_2$ based on the applied positive and negative voltage commanded from the controller 120. The measurement circuit 140 can include an integrator 150 having feedback capacitor CQ and outputs voltage VQ that drives an analog to digital converter (A/D) 160 to provide an indication of charge Q. No sample and hold circuits are employed by the measurement circuit 140 to determine charge conditions of the DCS 110 as with conventional systems. Also, other circuit elements such as voltage comparators for measuring the difference in output between sample and holds are also not employed by the measurement circuit 140 since charge measurements are made directly via the A/D 160 after application of opposite polarity charging pulses have been applied to the DCS 110 in a single charge cycle time period.

A sequencer 170 in the controller 120 cycles the order of opposite polarity voltages applied with respect to the first capacitor $C_1$ and the second capacitor $C_2$ over a frame sequence (e.g., four). For example, in one charge cycle time period, $C_1$ may be first pulsed positive and $C_2$ then pulsed negative in the same period. In another charge cycle time period, $C_2$ may first be pulsed positive followed by $C_1$ being pulsed negative. In yet another charge cycle time period, $C_1$ may be first pulsed negative followed by $C_2$ being pulsed positive, and so forth. The controller 120 issues duty cycle output commands shown as DC(Y) to the switching circuit 130. The duty cycle output command is based on an error signal from VQ via the charges applied to $C_1$ and $C_2$, where 50% duty cycle indicates no motion (e.g., acceleration) is presently detected.

If the positive or negative voltage is applied to the first capacitor $C_1$ during a given charge cycle time period, then the opposite polarity of the positive or negative voltage can be applied to the second capacitor $C_2$ during the same charge cycle time period. Application of the positive or negative voltage to $C_1$ and $C_2$ is removed during the charge cycle time period to enable determination of the charge Q of the first and second capacitor via the measurement circuit 140 and to enable determination of the duty cycle DC(Y) to control the movement of the pendulum P. The switching circuit 130 includes controllable voltage sources V+ SRC and V− SRC. Output from the voltages sources is switched to provide the positive and negative voltages to be applied to $C_1$ and $C_2$. The switched output from V+ SRC is shown as $V_1$ and the switched output from V− SRC is shown as $V_2$. The switched voltages $V_1$ and $V_2$ should be held closely to an absolute voltage value (e.g., both sources held to a value of 10 volts regardless of polarity) referred to as $V_0$.

The DCS 110 includes a proof mass (e.g., pendulum P) disposed between a top electrode structure associated with $C_1$ and a bottom electrode structure associated with $C_2$ of the DCS. As used herein, the term structure can refer to one of two plates where the pendulum is disposed between a top electrode plate and a bottom electrode plate to form two capacitors $C_1$ and $C_2$, for example. In another example, the term structure can include a comb-type configuration having a plurality of interweaved upper comb fingers associated with one capacitor and a plurality of bottom comb fingers associated with another capacitor that change their capacitance in response to movements of the pendulum.

The proof mass is positioned close to but slightly spaced from the top electrode structure and the bottom electrode structure such that the first capacitor $C_1$ is formed from the top electrode structure and the proof mass and second capacitor $C_2$ is formed from the bottom electrode structure and the proof mass. In one example, the system 100 can include an analog application-specific integrated circuit (ASIC) acting as the switching circuit 130. The system 100 can also include a field-programmable gate array (FPGA) acting as the controller 120, for example. A first control loop of the controller 120 is established to hold the pendulum P substantially centered within the DCS 110 by adjusting the duty cycle DC(Y) of charges (or voltages) applied to $C_1$ and $C_2$ during a charge cycle time period which controls movement of the pendulum P. To control the DCS 110, the top electrode of $C_1$ and the bottom electrode of $C_2$ can be coupled to positive or negative voltages $V_1$ or $V_2$ via switching circuits inside the switching circuit 130.

During operation, the controller 120 commands the switching circuit 130 to generate respective quantized pulse rebalanced (PRB) or pulse on demand (POD) sequences of $V_1$ and $V_2$ (positive and negative) polarity voltages over the charge cycle time period. The controller 120 commands the respective positive and negative voltages $V_1$ and $V_2$ at different times over the course of the charge cycle time period to each respective structure of $C_1$ and $C_2$. During each respective period, the integrator 150 generates a voltage VQ which is related to the charge (Q) that is built up on $C_1$ and $C_2$ during different times of the charge cycle time period. Depending on the difference between the charges, the controller 120 utilizes this difference to generate an appropriate charge cycle duty cycle for either capacitor charged to $V_1$ or $V_2$ that is required to achieve a charge difference between $C_1$ and $C_2$ of substantially zero which therefore indicates the pendulum P is at rest. Therefore, by generating an appropriate signal, and applying the signal to an opposite side electrode structure of a positive or negative input acceleration, the primary control loop can adjust the position of the pendulum P such that the pendulum remains substantially the same distance from each respective structure (centered) during each charge cycle time period.

As will be illustrated and described below with respect to FIG. 2, the sequencer 170 can generate various frame profiles over a frame sequence that indicate alternative charging cycle sequences to control the switching circuit 130. With $V_1$ representing a positive voltage and $V_2$ representing a negative voltage, four charging cycle sequences (e.g., one charging cycle sequence per frame) are possible representing $V_1/C_1$, $V_1/C_2$, $V_2/C_1$, and $V_2/C_2$. Within any given charge cycle time period however, each of the capacitors $C_1$ and $C_2$ are charged (e.g., pulsed) via opposite polarity voltages. The four frame sequences describing alternative charge cycle sequences can be executed serially and repeated or executed at random as will be described below. With random execution of the charging sequences, all four of the charging combinations representing $V_1/C_1$, $V_1/C_2$, $V_2/C_1$, and $V_2/C_2$ in a four cycle frame sequence can be executed before repeating any given one in the combination.

One or more secondary control loops 180 can be executed by the controller 120. The secondary control loops 180 are capable of regulating and stabilizing an absolute measurement range of the DCS 110 and scale factor by accumulating charge data over four successive charging and discharging cycles, for example. After accumulating the data, the controller 120 can issue voltage adjustment commands shown as V+ and V- to the switching circuit 130 to increase or decrease the voltage source V+ SRC and V- SRC, respectively. The integrator 150 during each successive charge cycle time period measures a respective charge between $V_1/C_1$, $V_1/C_2$, $V_2/C_1$, and $V_2/C_2$. The respective charge values between $V_1/C_1$, $V_1/C_2$, $V_2/C_1$, and $V_2/C_2$ of each successive charge cycle sequence are then transmitted to the A/D converter 160, which supplies a digital representation of charge to the controller 120. The controller 120 can perform accumulated charge sum and difference estimates to generate an error signal for the secondary control loops 180.

The accumulated estimates can be utilized by the controller 120 to adjust the V+ SRC and/or V- SRC reference voltages via the switching circuit 130, which factors into the generation of $V_1$ and $V_2$. Since $V_1$ or $V_2$ depends on the scale factor, the scale factor can regulate the absolute measurement range of the DCS 110, and thus compensate for variations in a chip capacitance, temperature, tolerance, and aging by providing a stable set point that would thus be independent of any chip capacitance's initial tolerances and changes with temperature and aging, for example. To provide symmetry between the V+ and V- reference amplitude voltages, the secondary loop 180 is also capable of controlling scale factory symmetry. That is, ensuring that V+ and V- are substantially the same voltage with opposite polarities (e.g., +5V and -5V) as will be described below with respect to FIG. 3.

Before proceeding, a few mechanical/electrical relationships are provided in the following equations. A delta charge $\Delta q$ can be determined that results from a displacement x of the pendulum P and the resulting force of the pendulum from a displacement x and a duty cycle y of the forcing function. Thus, with $C_1$ charged to voltage $V_1$ and $C_2$ charged to voltage $V_2$, for example, (or vis versa) the resulting delta charge $\Delta q$ (e.g., charge difference) observable at the common center electrode of the two capacitors can be determined based on the following:

$$C_1 = C_0/(1+x/d) \qquad \text{Equation 1}$$

$$C_2 = C_0/(1-x/d) \qquad \text{Equation 2}$$

where d is the distance between capacitor structures and $C_0$ is the capacitance of $C_1$ or $C_2$ when x is equal to zero. With $C_1$ charged to voltage $V_1$ and $C_2$ charged to voltage $V_2$, the resulting delta charge $\Delta q$ observable at the common center electrode of the two capacitors connected to the pendulum can be represented as:

$$\Delta q = V_1 \cdot C_1 + V_2 \cdot C_2 = C_0 \cdot [V_1/(1+x/d) + V_2/(1-x/d)] \qquad \text{Equation 3}$$

where the following assumptions are $V_1 = V_0$ and $V_2 = -V_0$. This results in the simplified expression for the observed delta charge, where $k_1 = 2V_0 C_0$:

$$\Delta q = -V_0 \cdot C_0 \cdot 2 \cdot x/d/(1-(x/d)^2) = -k_1 \cdot x/d/(1-(x/d)^2), \qquad \text{Equation 4}$$

The system 100 enables precise detection of the output voltage resulting from differences in $C_1$ and $C_2$ due to displacement of the pendulum P while charging and discharging is performed. This error signal can be processed and utilized to control switches in the switching circuit 130 to provide a quantized pulse rebalance (PRB) or pulse on demand (POD) control of the electrostatic force to counteract the input acceleration and hold the pendulum at its null position to determine acceleration for the system 100. The switching circuit 130 can include switches, power filtering and conditioning, controllable reference sources V+ SRC and V- SRC, and can also include the separately shown integrator 150 and A/D converter 160 as well as other auxiliary functions.

The sequence of charging $C_1$ and $C_2$ and signal sampling over the charge cycle time period is controlled such, that it will allow measurements of the absolute charge placed on $C_1$ and on $C_2$ during each charge cycle time period. These charges placed on the capacitors are then held unchanged during the forcing period of the frame period by removing the connection to the initially connected voltage sources. Knowing what the charges are and keeping them constant mitigates the need for linearization of pendulum parameters, as the force now becomes independent of pendulum displacement. FIGS. 2 and 3 provide a description of how this may be achieved and used to enable the secondary control loops 180 for setting and stabilizing the absolute measurement range and with it the instrument scale factor and scale factory symmetry to compensate for temperature and aging effects in the electronics and the DCS 110.

Figure 2:
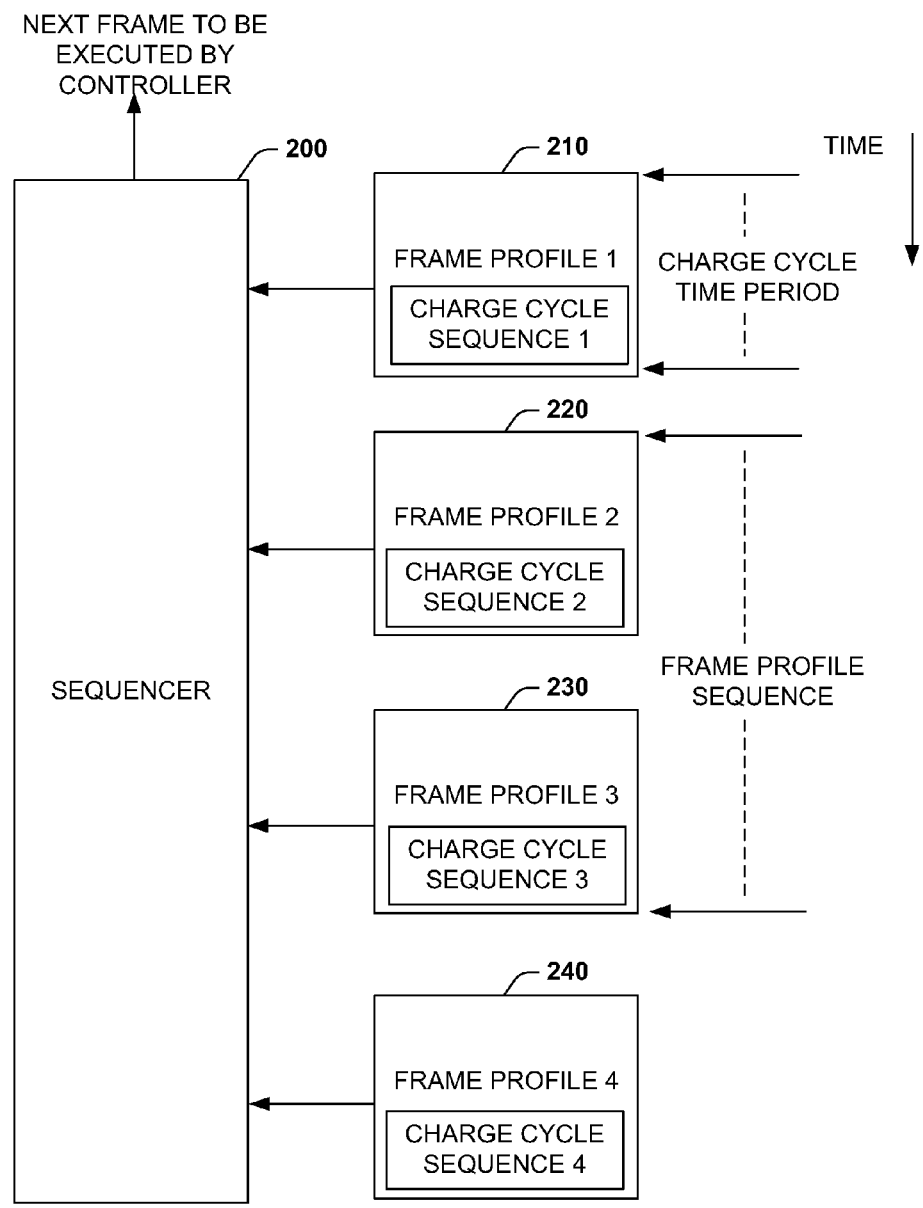
FIG. 2 illustrates an example of a sequencer that generates frame profiles of charging sequences to optimize performance of various parameters of a differential capacitance accelerometer.
Figure 3:
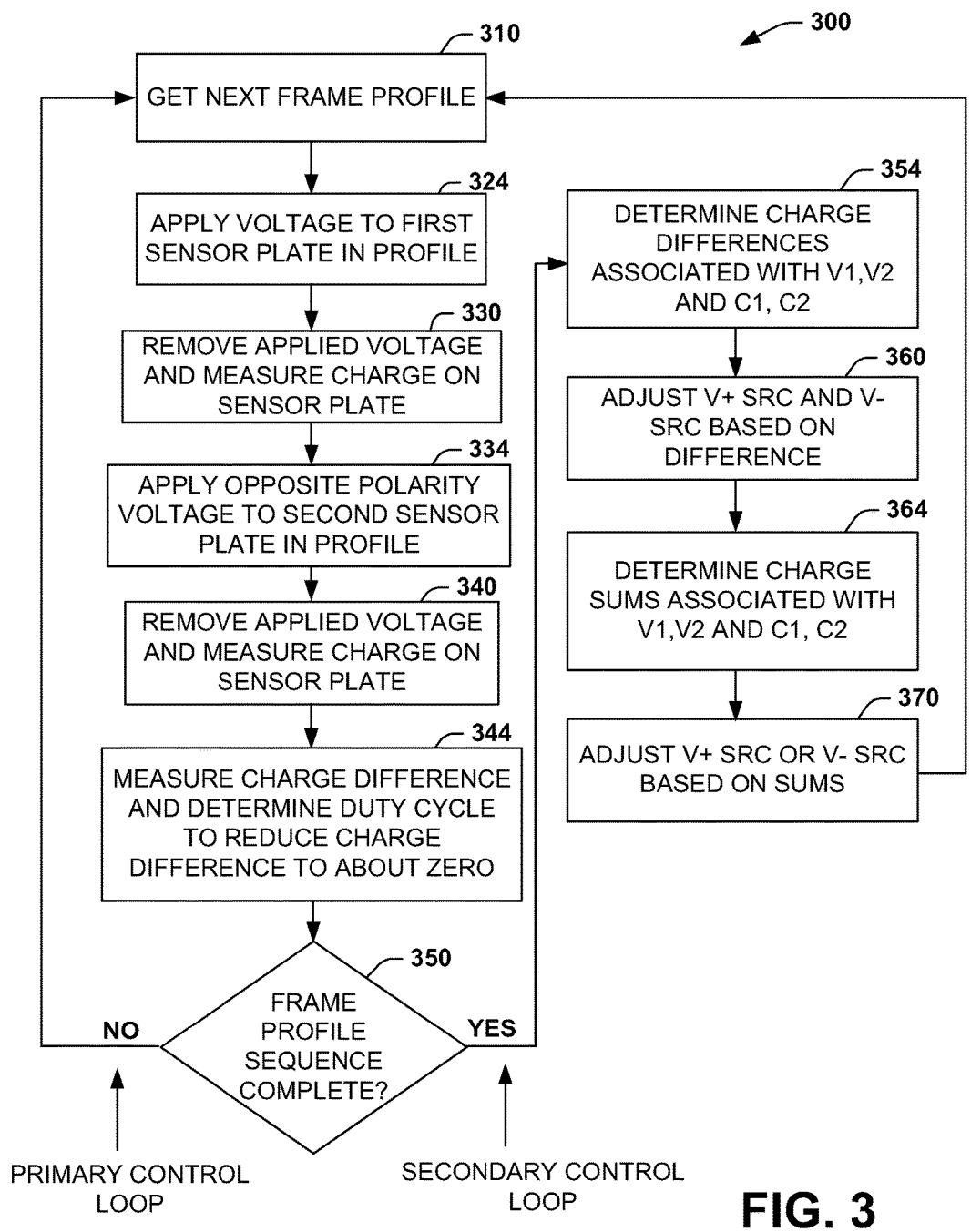
FIG. 3 illustrates an example of a method that utilizes control voltage and charging sequences to optimize performance of various parameters of a differential capacitance accelerometer.

FIG. 2 illustrates an example of a sequencer 200 that generates frame profiles of charging sequences to optimize performance of various parameters of a differential capacitance motion sensor. The sequencer 200 can be employed with the controller described above with respect to FIG. 1 to command a switching circuit to generate opposite polarity voltages to be supplied to the capacitance sensor during each charge cycle time period. The sequencer 200 executes a repeatable (e.g., 1, 2, 3, 4, 1, 2, 3, 4) or random pattern (e.g., 1, 3, 4, 2, 4, 2, 1, 3) of frame profiles shown as frame profiles 210 through 240. Each profile includes a charging cycle sequence that includes at least one set of opposite polarity voltages that are to be applied to the respective capacitors of the sensor and a discharge sequence based on the calculated duty cycle DC(Y) to balance the pendulum (sensing or moving mass) to maintain it at rest. For example, such voltages can be generated when the controller controls the switching of the switching circuit to discharge the first electrode structure and the second electrode structure according to a calculated duty cycle in a positive and a negative time direction relative to a center point of the frame profile where the center point is defined as (t=T/2).

Although more or less than four frame profiles 210-240 can be sequenced by the sequencer 200 and executed by the controller, four frame profiles allows the various charging cycle sequences of capacitor structure and voltage source combinations to be periodically executed which overcomes parametric errors that can be encountered over time if the similar/repetitive forcing patterns were employed. The charging cycle sequences specified by the frame profiles 210-240 include charging cycle sequence $V_1/C_1$ followed by $V_2/C_2$ in one frame profile, charging cycle sequence $V_2/C_1$ followed by $V_1/C_2$ in another frame profile, charging cycle sequence $V_1/C_2$ followed by $V_2/C_1$ in another frame profile, and a charging cycle sequence $V_2/C_2$ followed by $V_1/C_1$ in another frame profile, where $V_1$ and $V_2$ are substantially equal magnitude but opposite polarity voltages.

The following description provides four example frame profiles that can be executed as a frame sequence, where Com refers to a command to execute one portion of the charging cycle sequence within the respective frame profile. As will be described below with respect to FIG. 3, after executing a number of frame profiles, secondary loops can be executed to allow adjustment of the forcing voltages $V_1$ and $V_2$. For purposes of brevity, the following example Frame Profiles only show the acquisition of data associated with charging the capacitor at the beginning of a Frame Profile. However, additional utility may be gained by similarly acquiring and processing data associated with time points where the capacitors are discharged within a Frame Profile or other desired times within a Frame Profile to achieve the required duty cycle DC(Y).

Frame Profile 1:
Initial condition: $C_1$ and $C_2$ are without charge at the beginning of the cycle (frame rate)

Com11: At t=0 connect voltage source $V_+$ to charge capacitor $C_1$ to $V_1$
Com21: At t=$t_1$ disconnect voltage source $V_+$ from capacitor $C_1$ and keep $C_1$ floating
Com31: At t=$t_2$ measure output voltage $V_{q11}=V_1C_1/C_q$ which represents the charge $q_{11}=V_1C_1$ on $C_1$
Com41: At t=$t_3$ connect voltage source $V_-$ to charge capacitor $C_2$ to $V_2$
Com51: At t=$t_4$ disconnect voltage source $V_-$ from capacitor $C_2$ and keep $C_2$ floating
Com61: At t=$t_5$ measure output voltage $V_{\Delta q1}=V_{q11}+V_2C_2/C_q$ which represents delta charge $\Delta q_1$
Com71: Calculate the charge $q_{22}$ on $C_2$ using above measurements $V_{q22}=V_2C_2/C_q=V_{q11}+V_{\Delta q1}$
Com81: Use $V_{\Delta q1}$ to compute the duty cycle $y_1$ required to close the primary feedback loop to achieve $\Delta q=0$ by discharging $C_1$ and $C_2$ according to the required $y_1$.

The first cycle of Frame Profile 1 produces measurements for $\Delta q_1$ and charge $V_1C_1$ and a calculated value for $V_2C_2$ Frame Profile 2:
Initial condition: $C_1$ and $C_2$ are without charge at the beginning of the cycle (frame rate)
Com12: At t=0 connect voltage source $V_+$ to charge capacitor $C_2$ to $V_1$
Com22: At t=$t_1$ disconnect voltage source $V_+$ from capacitor $C_2$ and keep $C_2$ floating
Com32: At t=$t_2$ measure output voltage $V_{q12}=V_1C_2/C_q$ which represents the charge $q_{12}=V_1C_2$ on $C_2$
Com42: At t=$t_3$ connect voltage source $V_-$ to charge capacitor $C_1$ to $V_2$
Com52: At t=$t_4$ disconnect voltage source $V_-$ from capacitor $C_1$ and keep $C_1$ floating
Com62: At t=$t_5$ measure output voltage $V_{\Delta q2}=V_{q12}+V_2C_1/C_q$ which represents delta charge $\Delta q_2$
Com72: Calculate the charge $q_{21}$ on $C_1$ using above measurements $V_{q21}=V_2C_1/C_q=V_{q12}+V_{\Delta q2}$
Com82: Use $V_{\Delta q2}$ to compute the duty cycle $y_2$ required to close the primary feedback loop to achieve $\Delta q=0$ by discharging $C_1$ and $C_2$ according to the required $y_2$.

The second cycle of Frame Profile 2 produces measurements for $\Delta q_2$ and charge $V_1C_2$ and a calculated value for $V_2C_1$ Frame Profile 3:
Initial condition: $C_1$ and $C_2$ are without charge at the beginning of the cycle (frame rate)
Com13: At t=0 connect voltage source $V_-$ to charge capacitor $C_1$ to $V_2$
Com23: At t=$t_1$ disconnect voltage source $V_-$ from capacitor $C_1$ and keep $C_1$ floating
Com33: At t=$t_2$ measure output voltage $V_{q21}=V_2C_1/C_q$ which represents the charge $q_{21}=V_2C_1$ on $C_1$
Com43: At t=$t_3$ connect voltage source $V_+$ to charge capacitor $C_2$ to $V_1$
Com53: At t=$t_4$ disconnect voltage source $V_+$ from capacitor $C_2$ and keep $C_2$ floating
Com63: At t=$t_5$ measure output voltage $V_{\Delta q3}=V_{q21}+V_1C_2/C_q$ which represents delta charge $\Delta q_3$
Com73: Calculate the charge $q_{12}$ on $C_2$ using above measurements $V_{q12}=V_1C_2/C_q=V_{q21}+V_{\Delta q3}$
Com83: Use $V_{\Delta q3}$ to compute the duty cycle $y_3$ required to close the primary feedback loop to achieve $\Delta q=0$ by discharging $C_1$ and $C_2$ according to the required $y_3$.

The third cycle of Frame Profile 3 produces measurements for $\Delta q_3$ and charge $V_2C_1$ and a calculated value for $V_1C_2$ Frame Profile 4:
Initial condition: $C_1$ and $C_2$ are without charge at the beginning of the cycle (frame rate)

Com14: At t=0 connect voltage source $V_-$ to charge the first capacitor $C_2$ to $V_2$ Com24: At t=$t_1$ disconnect voltage source $V_-$ from the first capacitor $C_2$ and keep $C_2$ floating Com34: At t=$t_2$ measure output voltage $V_{q22}=V_2C_2/C_q$ which represents the charge $q_{22}=V_2C_2$ on $C_2$ Com44: At t=$t_3$ connect voltage source $V_+$ to charge capacitor $C_1$ to $V_1$ Com54: At t=$t_4$ disconnect voltage source $V_+$ from capacitor $C_1$ and keep $C_1$ floating Com64: At t=$t_5$ measure output voltage $V_{\Delta q4}=V_{q22}+V_1C_1/C_q$ which represents delta charge $\Delta q_4$ Com74: Calculate the charge on $C_1$ using above measurements $V_{q11}=V_1C_1/C_q=V_{q22}+V_{\Delta q4}$ Com84: Use $V_{\Delta q4}$ to compute the duty cycle $y_4$ required to close the primary feedback loop to achieve $\Delta q=0$ by discharging $C_1$ and $C_2$ according to the required $y_4$.

The fourth cycle of Fame Profile 4 produces measurements for $\Delta q_4$ and charge $V_2C_2$ and a calculated value for $V_1C_1$.

In view of the foregoing structural and functional features described above, a methodology in accordance with various aspects of the present invention will be better appreciated with reference to FIG. 3. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method can be executed automatically such as via a processor, computer, and/or controller configured with executable instructions to carry out the various acts or commands described herein.

FIG. 3 illustrates an example of a method 300 that utilizes control voltage and charging sequences to optimize performance of various parameters of a differential capacitance motion sensor. At 310, the method 300 includes getting a next frame profile to be executed. As noted above with respect to FIG. 2, frame profiles describe charging cycle sequences and measurement periods where equal and opposite voltages are applied to each capacitor structure of a capacitance sensor during each charge cycle time period. At 324, the method 300 applies a voltage to a first sensor structure specified in the profile. In some profiles, capacitor $C_1$ is specified first, and in other profiles, capacitor $C_2$ is specified first. At 330 of the method 300, the applied voltage is removed (e.g., via switching circuit 130 of FIG. 1) and the charge on the sensor structure is measured (e.g., via measurement circuit 140 of FIG. 1). Typically, as described above with respect to FIG. 2, there is a time delay within a charge cycle time period between when the voltage is removed and the charge on the sensor structure is measured.

At 334 of the method 300, the opposite polarity voltage from that applied at 324 is applied to the second sensor structure. Thus, if $C_1$ had voltage applied at 324, then $C_2$ would have the opposite polarity voltage applied at 334. If $C_2$ had voltage applied at 324, then $C_1$ would have the opposite polarity voltage applied at 334, and so forth. At 340 of the method 300, the applied voltage is removed from the second sensor structure (e.g., via switching circuit 130 of FIG. 1) and the resulting charge difference on the sensor structures of $C_1$ and $C_2$ is measured (e.g., via measurement circuit 140 of FIG. 1). Typically, as described above with respect to FIG. 2, there is a time delay within a charge cycle time period between when the voltage is removed and the charge difference on the sensor structures is measured.

At 344, the method 300 includes measuring a charge difference between the first measured charge and the second measured charge and determining a duty cycle to reduce the charge difference to about zero (e.g., delta Q=0). At 350, the method 300 determines if the charging/discharging cycle sequence is complete. This determination at 350 typically changes after four frame profiles describing charging sequences have executed. Thus, if four frame sequences, for example, (or other predetermined number) have not executed, the method proceeds back to 310 and continues to execute the primary control loop as shown. If the charge sequence (e.g., four frame profiles executed) has completed at 350, the method proceeds to 354 and begins execution of a secondary control loop.

At 354, of the method 300, a determination of charge differences over charging combinations $V_1$, $V_2$, $C_1$, and $C_2$ are made where $V_1$ and $V_2$ are equal voltages but opposite in magnitude. The difference of charges associated with $V_1$ and $V_2$ for four successive cycles can be computed as in the following example. Under the condition that on average $\Delta q=0$ (e.g., charge difference is about zero) is established by the primary control loop, the following assumption can be made:

$$\text{Diff}=(V_1C_1+V_1C_2)-(V_2C_1+V_2C_2)=V_1(C_1+C_2)-V_2(C_1+C_2) \quad \text{Equation 5}$$

With Equation 1 and 2 above and $x/d \ll 1$ then, approximate $C_1+C_2=2C_0$ which yields $$\text{Diff}=2C_0(V_1-V_2) \quad \text{Equation 6}$$

And with $V_2=-V_1=V_0$ further results in $$\text{Diff}=4C_0V_0=4Q_0 \quad \text{Equation 7}$$

On average this can be made a valid assumption with $\Delta q=0$ as a valid condition if the primary control loop is operating at sufficient bandwidth to enable $x/d \ll 1$ ($\Delta q=0$) on average.

At 360 of the method 300, the above condition can be enforced with a secondary low bandwidth control loop to adjust V+ to assure $V_1=V_0$ (where $V_0$ is the magnitude of $V_1$ and $V_2$) is fulfilled at substantially all times. This establishes that measurement range and scale factor can be set by selecting the voltage $V_0$ to compensate for variations in the chip capacitance $C_0$. As $C_0$ has fabrication tolerances and also changes with temperature and aging, by controlling V+ and with it $V_0$ the measurement range and the scale factor may be selected and controlled to make them independent of chip capacitance initial tolerances and changes with temperature and aging. In another example, V− could be adjusted at 360, where V+ would then be adjusted in subsequent acts as described below.

At 364 of the method 300, a determination of charge differences over charging combinations $V_1$, $V_2$, $C_1$, and $C_2$ are made where $V_1$ and $V_2$ are equal voltages but opposite in magnitude. In this example secondary loop, calculate the sum of all charges deployed during four successive frame profiles, for example.

Under the condition that on average $\Delta q=0$ is established by the primary control loop, the following assumption:

$$\text{Sum}=V+V_1C_2+V_2C_1+V_2C_2=V_1(C_1+C_2)+V_2(C_1+C_2)=2C_0(V_1+V_2) \quad \text{Equation 8}$$

With V+ controlled for $V_1$ to equal $V_0$, control V− for $V_2$ to equal $-V_0$ which results in the condition $$\text{Sum}=2C_0(V_0-V_0)=0 \quad \text{Equation 9}$$

The above condition can be enforced with a secondary low bandwidth control loop to adjust V− at 370 to establish $V_2=-V_1=-V_0$ is substantially enforced at all times. This will establish scale factor symmetry. If V− were adjusted above at 360, then V+ can be adjusted at 370 to provide scale factor symmetry based on Equation 9. After the secondary control loops are executed and ending at 370, the method proceeds back to 310 to retrieve the next frame profile. Although not shown, the method 300 can also include adjusting discharge time points relative to a center of a period according to the duty cycle DC(Y) in a positive and negative direction toward the beginning and end of the period. In this manner, the method can generate the needed residual positive or negative charge forces to counteract acceleration action on the moving mass to maintain it centered between the electrodes.

Figure 4:
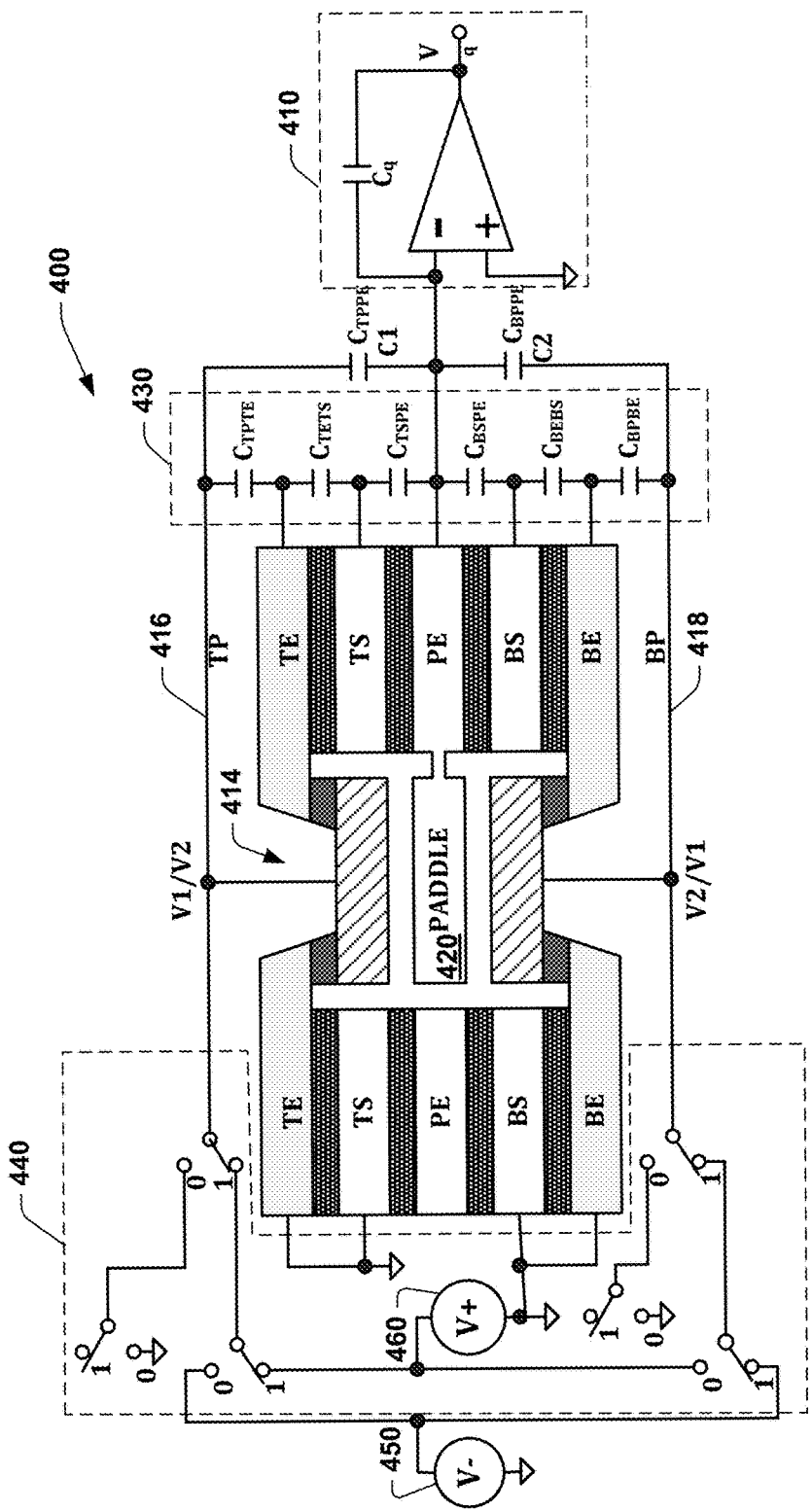
FIG. 4 illustrates an example switching circuit that switches control voltage and charging sequences to optimize performance of various parameters of a differential capacitance accelerometer.

FIG. 4 illustrates an example switching circuit 400 that switches control voltage and charging sequences to optimize performance of various parameters of a differential capacitance accelerometer. The circuit 400 includes an integrator circuit 410 that integrates charge from a differential capacitance sensor 414 having a top structure (TP) 416 and bottom structure (BP) 418. A paddle 420 represents the inertial mass or pendulum described above. Various planes of the sensor 414 include a top electrode (TE), a top shield (TS), a paddle electrode (PE) a bottom shield (BS), and a bottom electrode (BE). Various parasitic capacitances $C_{TPTE}$, $C_{TETS}$, $C_{TSPE}$, $C_{BSPE}$, $C_{BEBS}$, $C_{BPBE}$, of the sensor 414 are represented at 430. A. switching network 440 can be provided to switch sources V− at 450 and V+ at 460 to the top and bottom electrode 416 and 418, respectively.

FIGS. 5 through 16 illustrate example timing diagrams that illustrate example charging cycle sequences with different input accelerations for a differential capacitance sensor. The examples illustrate possible charging sequences for four successive charging cycle sequences for zero, positive and negative sensor input acceleration. These sequences allow the acquisition of the signals to control primary and secondary control loops for acceleration, absolute scale factor and scale factor symmetry as described above.

Assuming a frame rate of about 10 kHz (100 microseconds) and a desired resolution of 10 bits (1024 steps per frame), for example, a clock frequency of about 10 MHz (100 nsec) can be provided. Other time frames and rates are possible. Assuming a total switch on resistance of Ron=1 kOhm and a capacitance of Cload=100 pF (chip capacitance $C_0$ and stray/parasitic capacitance combined) yields a charge/discharge time constant of (Tq)=Ron*Cload=100 nsec. Thus, it can take on the order of about 10 (Tq) periods for the signal to settle to about 50 parts per million (ppm) in a given charge cycle period. This indicates that the time between t0 and t1 as well as between t3 and t4 of a given charging cycle sequence specified by a frame profile should be in the order of about 1 microsecond (10 clock cycles). This may cause slightly more than 2% unusable range for charging at the beginning of the charging cycle sequence and roughly 2% for settling of the discharging at the end of the sequence, leaving slightly more than 95% usable frame rate for measuring acceleration. However, under different settling conditions more than 95% utilization of the charging cycle sequence may be achieved.

FIGS. 5 though 8 illustrate example timing diagrams that illustrate example charging cycle sequences when input acceleration for a differential capacitance sensor is zero. Signals representing $V_1/C_1$, $V_2/C_2$, and VQ are represented on the vertical axis and time is represented along the horizontal axis. FIG. 5 represents $V_1/C_1$ and $V_2/C_2$ charging cycle sequence when acceleration is zero. As shown in FIG. 5, at $t=t_0=0$ connect voltage source. V+ to charge capacitor $C_1$ to $V_1$. At $t=t_1$ disconnect voltage source V+ from capacitor $C_1$ and keep $C_1$ floating. At $t=t_2$ measure output voltage $V_{q11}=V_1C_1/C_q$ which represents the charge $q_{11}=V_1C_1$ on $C_1$. At $t=t_3$ connect voltage source V− to charge capacitor $C_2$ to $V_2$. At $t=t_4$ disconnect voltage source V− from capacitor $C_2$ and keep $C_2$ floating. At $t=t_5$ measure output voltage $V_{\Delta q1}=V_{q11}+V_2C_2/C_q$ which represents delta charge $\Delta q_1$. The calculated duty cycle DC(Y) is based on $V_{\Delta q1}$ and discharge $C_1$ at time $t_6=(1+Y)T/2$ and $C_2$ at time $t_7=t_3+(1-Y)T/2$, where T equals the time duration for one Fame Period.

FIG. 6 represents a $V_1/C_2$ and $V_2/C_1$ charging cycle sequence when acceleration is zero. At $t=t_0=0$ connect voltage source V+ to charge capacitor $C_2$ to $V_1$. At $t=t_1$ disconnect voltage source V+ from capacitor $C_2$ and keep $C_2$ floating. At $t=t_2$ measure output voltage $V_{q12}=V_1C_2/C_q$ which represents the charge $q_{12}=V_1C_2$ on $C_2$. At $t=t_3$ connect voltage source V− to charge capacitor $C_1$ to $V_2$. At $t=t_4$ disconnect voltage source V− from capacitor $C_1$ and keep $C_1$ floating. At $t=t_5$ measure output voltage $V_{\Delta q2}=V_{q12}+V_2C_1/C_q$ which represents delta charge $\Delta q_2$. Calculate duty cycle DC(Y) based on $V_{\Delta q2}$ and discharge $C_2$ at time $t_6=(1+Y)T/2$ and $C_1$ at time $t_7=t_3+(1-Y)T/2$, where T equals the time duration for one Fame Period.

Figure 7:
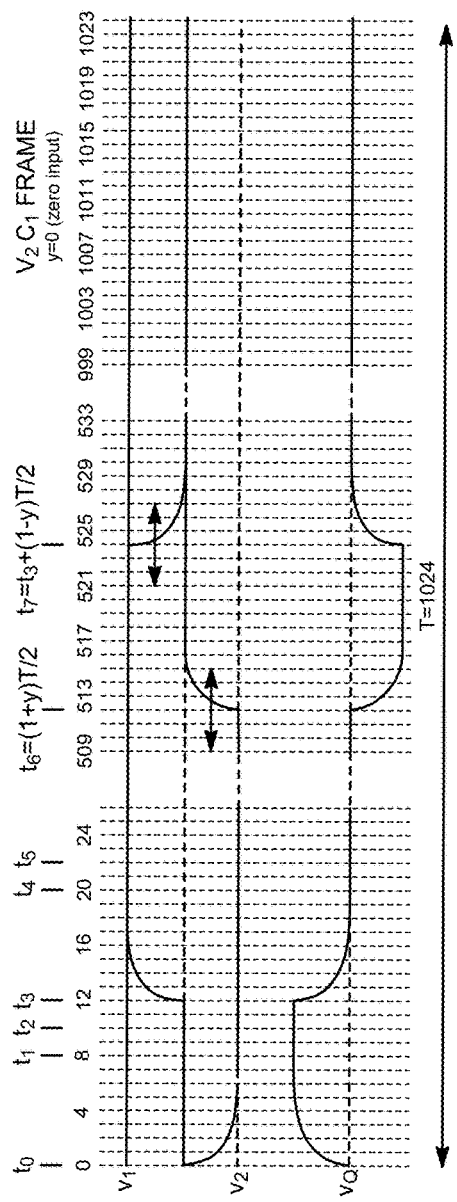

FIG. 7 represents $V_2/C_1$ and $V_1/C_2$ charging cycle sequence when acceleration is zero. At $t=t_0=0$ connect voltage source V− to charge capacitor $C_1$ to $V_2$. At $t=t_1$ disconnect voltage source V− from capacitor $C_1$ and keep $C_1$ floating. At $t=t_2$ measure output voltage $V_{q21}=V_2C_1/C_q$ which represents the charge $q_{21}=V_2C_1$ on $C_1$. At $t=t_3$ connect voltage source V+ to charge capacitor $C_2$ to $V_1$. At $t=t_4$ disconnect voltage source V+ from capacitor $C_2$ and keep $C_2$ floating. At $t=t_5$ measure output voltage $V_{\Delta q3}=V_{q21}+V_1C_2/C_q$ which represents delta charge $\Delta q_3$. Calculate duty cycle DC(Y) based on $V_{\Delta q3}$ and discharge $C_1$ at time $t_6=(1+Y)T/2$ and $C_2$ at time $t_7=t_3+(1-Y)T/2$, where T equals the time duration for one Fame Period.

Figure 8:
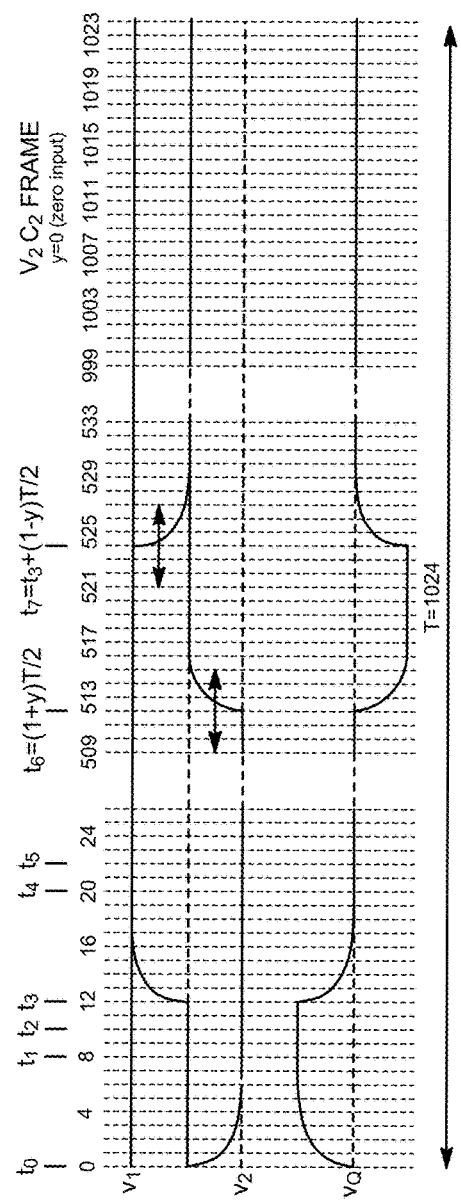

FIG. 8 represents a $V_2/C_2$ and $V_1/C_2$ charging cycle sequence when acceleration is zero. At $t=t_0=0$ connect voltage source V− to charge the first capacitor $C_2$ to $V_2$. At $t=t_1$ disconnect voltage source V− from the first capacitor $C_2$ and keep $C_2$ floating. At $t=t_2$ measure output voltage $V_{q22}=V_2C_2/C_q$ which represents the charge $q_{22}=V_2C_2$ on $C_2$. At $t=t_3$ connect voltage source V+ to charge capacitor $C_1$ to $V_1$. At $t=t_4$ disconnect voltage source V+ from capacitor $C_1$ and keep $C_1$ floating. At $t=t_3$ measure output voltage $V_{\Delta q4}=V_{q22}+V_1C_1/C_q$ which represents delta charge $\Delta q_4$. Calculate duty cycle DC(Y) based on $V_{\Delta q4}$ and discharge $C_2$ at time $t_6=(1+Y)T/2$ and $C_1$ at time $t_7=t_3+(1-Y)T/2$, where T equals the time duration for one Fame Period.

FIGS. 9 though 12 illustrate example timing diagrams that illustrate example charging cycle sequences when input acceleration for a differential capacitance sensor is near full scale positive. For purposes of brevity, the charging, duty cycle calculation and discharging cycle sequences are substantially the same as that described above with respect to FIGS. 5 through 8 and thus description of voltage applications and times are omitted. FIG. 9 represents a $V_1/C_1$ and $V_2/C_2$ charging cycle sequence when acceleration is near positive full scale and FIG. 10 represents a $V_1/C_2$ and $V_2/C_1$ charging cycle sequence when acceleration is near positive full scale. FIG. 11 represents a $V_2/C_1$ and $V_1/C_2$ charging cycle sequence when acceleration is near positive full scale and FIG. 12 represents a $V_2/C_2$ and $V_1/C_1$ charging sequence when acceleration is near positive full scale.

FIGS. 13 though 16 illustrate example timing diagrams that illustrate example charging cycle sequences when input acceleration for a differential capacitance sensor is near full scale negative. FIG. 13 represents a $V_1/C_1$ and $V_2/C_2$ charging cycle sequence when acceleration is near negative full scale and FIG. 14 represents a $V_1/C_2$ and $V_2/C_1$ charging cycle sequence when acceleration is near positive full negative. FIG. 15 represents a $V_2/C_1$ and $V_1/C_2$ charging cycle sequence when acceleration is near negative full scale and FIG. 12 represents a $V_2/C_2$ and $V_1/C_1$ charging cycle sequence when acceleration is near negative full scale.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a capacitance sensor having an inertial proof mass disposed between a first electrode structure and a second electrode structure;
   a switching system switchable between providing one of a positive charge pulse and a negative charge pulse to one of the first electrode structure and the second electrode structure;
   a sequencer to generate a plurality of frame profiles describing a plurality of different charge cycle sequences for providing the positive charge pulse and the negative charge pulse to one of the first electrode structure and the second electrode structure; and
   a controller that controls the switching of a switching circuit based on at least one frame profile of the plurality of profiles to provide one of the positive charge pulse or the negative charge pulse to the first electrode structure during a first portion of a charge cycle time period and to provide an opposite polarity charge pulse from that provided to the first electrode structure to the second electrode structure during a second portion of the charge cycle time period to generate an error signal with respect to the inertial proof mass of the capacitance sensor,
   wherein the controller issues a command based on a sum of charges according to the equation Sum=2C0 (V1+V2) to adjust a positive voltage source or a negative voltage source of the capacitance sensor that is switched as V1 or V2 to the first and second electrode of the capacitance sensor,
   wherein $C_0$ is the value of capacitance associated with the first or second electrode when displacement of the inertial proof mass is zero, and
   wherein $V_1$ and $V_2$ are voltages that are substantially equal in magnitude and opposite in polarity that are applied to the capacitance sensor.

2. The system of claim 1, further comprising a measuring circuit to measure charge received from the first electrode structure and the second electrode structure of the capacitance sensor.

3. The system of claim 2, wherein the measuring circuit includes an integrator to accumulate charge from the capacitance sensor and an analog to digital converter to digitize a charge value for the accumulated charge for the controller.

4. The system of claim 1, wherein the sequencer generates four frame profiles that describe four voltage and capacitance charging cycle sequences to charge the capacitance sensor, wherein the charging cycle sequences include a first voltage applied to a first capacitor ($V_1/C_1$) followed by a second voltage applied to a second capacitor ($V_2/C_2$) in one frame profile, the second voltage applied to the first capacitor ($V_2/C_1$) followed by the first voltage applied to the second capacitor ($V_1/C_2$) in another frame profile, the first voltage applied to the second capacitor ($V_1/C_2$) followed by the second voltage applied to the first capacitor ($V_2/C_1$) in yet another frame profile, and the second voltage applied to the second capacitor ($V_2/C_2$) followed by the first voltage applied to the first capacitor ($V_1/C_1$) in still yet another frame profile, where $V_1$ and $V_2$ have substantially equal magnitudes but have opposite polarity voltages and $C_1$ is a capacitance associated with the first electrode with respect to the inertial proof mass and $C_2$ is a capacitance associated with the second electrode with respect to the inertial proof mass.

5. The system of claim 4, wherein the controller determines a charge difference according to the equation Diff=$2C_0(V_1-V_2)$=$4C_0V_0$ where $C_0$ is the value of capacitance associated with the first or second electrode when displacement of the inertial proof mass is zero, and $V_0$ is an absolute magnitude value representing about equal but opposite voltages $V_1$ and $V_2$ applied to the capacitance sensor.

6. The system of claim 5, wherein the controller issues a command based on the charge difference to adjust the positive voltage source and the negative voltage source that is switched as $V_1$ or $V_2$ to the first and second electrode of the capacitance sensor.

7. The system of claim 1, wherein the controller controls the switching of the switching circuit to discharge the first electrode structure and the second electrode structure according to a calculated duty cycle in a positive and a negative time direction relative to a center point of the frame profile where the center point is specified as (t=T/2) where T is a duration of time and t is a point in time within the duration of time.

8. A method comprising:
   generating, by a processor, a plurality of frame profiles describing a plurality of different charge cycle sequences for applying charge pulses to a capacitance sensor;
   applying, by the processor, the charge pulses to the capacitance sensor in a first polarity configuration during a first portion of a charge cycle time period based on at least one frame profile of the plurality of frame profiles;
   measuring, by the processor, a first measured charge from the capacitance sensor during the first portion of the charge cycle time period;
   applying, by the processor, the charge pulses to the capacitance sensor in an opposite polarity configuration from that of the first polarity configuration during a second portion of the charge cycle time period;
   measuring, by the processor, a second measured charge from the capacitance sensor during a second portion of the charge cycle time period;
   measuring, by the processor, a charge difference between the first measured charge and the second measured charge and determining a duty cycle to reduce the charge difference to zero; and issuing a command based on the charge difference to adjust the magnitudes of a positive voltage source and a negative voltage source that are switched as $V_1$ and $V_2$ to the capacitance sensor.

9. The method of claim 8, wherein generating the plurality of frame profiles comprises generating four frame profiles that describe four voltage and capacitance charging cycle sequences to charge the capacitance sensor, wherein the charging cycle sequences include a first voltage applied to a first capacitor ($V_1/C_1$) followed by a second voltage applied to a second capacitor ($V_2/C_2$) in one frame profile, the second voltage applied to the first capacitor ($V_2/C_1$) followed by the first voltage applied to the second capacitor ($V_1/C_2$) in another frame profile, the first voltage applied to the second capacitor ($V_1/C_2$) followed by the second voltage applied to the first capacitor ($V_2/C_1$) in yet another frame profile, and the second voltage applied to the second capacitor ($V_2/C_2$) followed by the first voltage applied to the first capacitor ($V_1/C_1$) in still yet another frame profile, where $V_1$ and $V_2$ have substantially equal magnitudes but have opposite polarity voltages and $C_1$ is a capacitance associated with the first electrode with respect to the inertial proof mass and $C_2$ is a capacitance associated with the second electrode with respect to the inertial proof mass.

10. The method of claim 9, further comprising determining the charge difference according to the equation $\text{Diff}=2C_0(V_1-V_2)=4C_0V_0$ where $C_0$ is the value of capacitance associated with the first or second electrode when displacement of the inertial proof mass is zero, and $V_0$ is an absolute magnitude value representing about equal but opposite voltages $V_1$ and $V_2$ applied to the capacitance sensor.

11. The method of claim 10, further comprising determining a sum of charges according to the equation $\text{Sum}=2C_0(V_1+V_2)$ where $C_0$ is the value of capacitance associated with the first or second electrode when displacement of the inertial proof mass is zero, wherein $V_1$ and $V_2$ are about equal but opposite voltages applied to the capacitance sensor.

12. The method of claim 11, further comprising issuing a command based on the sum of charges to adjust a magnitude of a positive voltage source or a negative voltage source that are switched as $V_1$ and $V_2$ to the capacitance sensor.

13. The method of claim 12, further comprising adjusting discharge time points relative to a center of a period according to the duty cycle in a positive and negative direction toward the beginning and end of the period.

14. An accelerometer comprising:

a capacitance sensor having an inertial proof mass disposed between a first electrode structure and a second electrode structure;

a switching circuit switchable between providing charge pulses to the capacitance sensor in a first polarity configuration to the first electrode structure and providing the charge pulses to the capacitance sensor in an opposite polarity configuration from the first polarity configuration to the second electrode structure;

a sequencer to generate a frame profile that describes an order of the first polarity configuration and the opposite polarity configuration of charge pulses to be provided to the first electrode structure and the second electrode structure of the capacitance sensor during a charge cycle time period; and a controller that controls the switching of the switching circuit based on the frame profile received from the sequencer to generate an accelerometer error signal with respect to the inertial proof mass of the capacitance sensor, wherein the controller determines a charge difference between a charge to the first electrode structure and a charge to the second electrode structure and issues a command based on the charge difference to adjust the positive voltage source or the negative voltage source that is switched as $V_1$ or $V_2$ to the first and second electrode of the capacitance sensor.

15. The accelerometer of claim 14, further comprising a measuring circuit to measure the charge received from the first electrode structure and the second electrode structure of the capacitance sensor.

16. The accelerometer of claim 14, further comprising a sequencer to generate at least one frame profile for the controller that describes the normal polarity configuration and the reverse polarity configuration to be applied to the capacitance sensor during the charge cycle time period.

* * * * *